United States Patent [19]

Maeda

[11] Patent Number: 5,099,464

[45] Date of Patent: Mar. 24, 1992

[54] MAGNETO OPTICAL DISK RECORDING APPARATUS INCLUDING A PLURALITY OF CONNECTED RECORDING UNIT BUFFER MEMORIES

[75] Inventor: Yasuaki Maeda, Tokyo, Japan

[73] Assignee: Sony Corporation, Tokyo, Japan

[21] Appl. No.: 391,568

[22] PCT Filed: Nov. 28, 1988

[86] PCT No.: PCT/JP88/01201

§ 371 Date: Jul. 25, 1989

§ 102(e) Date: Jul. 25, 1989

[87] PCT Pub. No.: WO89/05509

PCT Pub. Date: Jun. 15, 1989

[30] Foreign Application Priority Data

Nov. 30, 1987 [JP] Japan .................. 62-301845

[51] Int. Cl.$^5$ .................. G11B 13/04; G11B 7/09; G11B 7/095
[52] U.S. Cl. .................. 369/13; 369/54; 369/58; 369/59; 369/47; 369/44.33
[58] Field of Search ............ 369/54, 58, 44.32, 44.33, 369/59, 13, 47, 48

[56] References Cited

U.S. PATENT DOCUMENTS

| | | | |
|---|---|---|---|
| 4,363,116 | 12/1982 | Kleuters et al. | 369/54 X |
| 4,623,993 | 11/1986 | Schlosser | 369/44.32 |
| 4,796,247 | 1/1989 | Vogelsang | 369/44.32 OR |
| 4,841,513 | 6/1989 | Farhangi et al. | 369/59 OR |

FOREIGN PATENT DOCUMENTS 61-139984 6/1986 Japan .
62-92245 4/1987 Japan .

Primary Examiner—Stuart S. Levy
Assistant Examiner—Hoa T. Nguyen
Attorney, Agent, or Firm—Lewis H. Eslinger; Jay H. Maioli

[57] ABSTRACT

A disk recording apparatus (10) is designed for recording predetermined input data $D_{IN}$ onto a disk-like recording medium (21) having recording tracks on which predetermined absolute address information has been recorded in advance. The disk recording apparatus comprises input memory control means (15), (16) and (17) which successively store the input data $D_{IN}$ for every predetermined recording units (FB$_0$), (FB$_1$), (FB$_2$), ..., (FB$_N$) and read the data from given positions ($t_0$), ($t_1$), ($t_2$), ..., ($t_N$) for each of said predetermined recording units to send them to recording means (20) and (22). The apparatus further comprises abnormal condition detection and control means (15) which always monitors the absolute address information on said recording tracks to detect any abnormal condition based on said absolute address information. When abnormal condition has developed, the control means (15) calculates the return time required for said recording means (20) and (22) to return to the head position of said recording unit that is being recorded on the recording track, and controls and records the reading positions ($t_0$), ($t_1$), ($t_2$), ..., ($t_N$) of said input memory control means (15), (16) and (17) in advance by the number of recording units that correspond to the calculated result. Probability of elimination of the recorded data is thus avoided even when abnormal condition has developed in the recording means (20), (22) while the input data $D_{IN}$ are being recorded.

7 Claims, 5 Drawing Sheets

CONTRACTION OF DISK RECORDING APPARATUS

DATA FORMAT FOR ONE FRAME

ARRANGEMENT OF ONE BLOCK OF SUB-CODE CHANNEL

CONTRACTION OF DISK RECORDING APPARATUS

ARRANGEMENT OF A MEMORY BUFFER CIRCUIT
AND A DATA SELECT CIRCUIT

ARRANGEMENT OF REPRODUCING CONTROL SIGNAL

RECORDING CONTROL PROGRAM

MAGNETO OPTICAL DISK RECORDING APPARATUS INCLUDING A PLURALITY OF CONNECTED RECORDING UNIT BUFFER MEMORIES

TECHNICAL FIELD

This invention relates to a disk recording apparatus in which continuous input data such as musical signals are recorded on a disk-like recording medium on the recording tracks of which the predetermined absolute address information is recorded in advance. It is preferably applied to a recordable optical disk apparatus, such as the constant linear velocity (CLV) type write once (WO) type or erasable type optical disk apparatus.

BACKGROUND ART

The present Applicant has already proposed a disk recording apparatus according to which the information is recorded in a data format standardized in a compact disk (CD), using a recordable disk, such as a magneto-optical disk, having a vertical magnetization film exhibiting magneto-optical effect as the magnetic recording layer, as shown for example in PCT/JP87/00764.

Referring to a diagrammatic view of FIG. 1, a prerecorded region 5 in which a circumferentially extending pattern of projections and recesses is previously formed by pits 4 and a data recording region 6 in which the magneto-optical recording is performed are arranged alternately each at an equal pitch in each land region 3 defined between spirally extending pregrooves 2 on a magneto-optical disk 1 used as the recording medium in the above disk recording apparatus.

In the data format, standardized in the compact disk (CD), information data of each processing unit or frame are formed by 33 symbols (264 bits) made up of 24 symbols (12 words) each composed of eight bits, each four symbols of error correction codes P and Q and a symbol as a sub-code for control or user data. The data bit of each frame is subjected to a so-called eight to fourteen modulation (EFM) so that the eight bit data of each symbol are converted into a 14-bit pattern to produce 14×33 bits or 33 symbols, to which 24-bit sync signals are annexed. Three merging bits each are placed between adjacent symbols to produce 588 channel bits which make up one frame shown in FIG. 2. The eight bits of the one symbol annexed as the aforementioned control data or user data from sub-code channels P, Q, R, S, T, U, V and W constitute a data block or a large frame composed of 98 symbols corresponding to 98 frames, as shown in FIG. 3. Meanwhile, the two symbols at the leading part of the block are dedicated to sync patterns S0 and S1 for demarcating the boundary of this data block.

In the above described magneto-optical disk 1, the frame sync signals and the sub-code among the 588 channel bits making up each frame are recorded in advance as a pattern of projections and recesses on the pre-recorded region 5 by molding and the absolute time or absolute address information from the start position of the data record region 6 is afforded by the Q-channel of the aforementioned sub-code.

In the above described disk recording apparatus, making use of the magneto-optical disk 1, data such as play information and parity are photomagnetically recorded on the data record region 6, while the disk rotation control is performed at a CLV or constant linear velocity on the basis of the reproducing output from the pre-recorded region 5 of the disk 1 and tracking servo as well as focusing servo is applied to the optical head.

In the above described disk recording apparatus, when the servo for the optical head is disturbed by some perturbation or malfunction such as vibration or noises in the power source to give rise to abnormal conditions such as incorrect focussing servo control or track jumps, interrupted portions are produced in the data recorded on the magneto-optical disk at the time point of occurrence of these abnormal conditions.

The present Applicant has already proposed a disk recording apparatus wherein the track jump is detected during the recording operation and, on occurrence of a track jump, the laser power of the optical head is lowered to the reproducing level, and then the optical head is controlled to jump tracks to the desired track and operation is resumed on the desired track to prevent the information from being recorded in other than the desired track, as shown for example in PCT/JP88/00196.

Meanwhile, if such interruption of the record data should occur during the time the disk recording apparatus is used as the computer terminal, it is possible to re-read the record data by the communication exchange procedure with the host computer to make re-recording from the leading end of the interrupted portion.

It is possible in this manner to lower the laser power of the optical head to the reproducing level, and to perform the track jump control to cause the recording operation to be resumed at the desired track to prevent the information from being erroneously recorded in other than the desired track. However, when recording continuous data on a real time basis, as in live recording of musical performance, the interrupted portion cannot actually be recovered. Even supposing that the optical head is returned immediately to the original recording track, the musical performance data is lost for the time interval that has elapsed during control of the track jump. Thus there is necessarily the risk that the listener cannot but feel disagreeable on account of occurrence of the interrupted portion during the musical performance at the time of reproduction.

The present invention has been made in view of the foregoing and is aimed to provide a disk recording apparatus wherein, even when abnormal conditions such as incorrect focussing servo or track jump should occur in the optical head during data recording, record data loss may be avoided in advance to permit data to be recorded correctly.

DISCLOSURE OF THE INVENTION

For accomplishing the above object, the present invention provides a disk recording apparatus in which predetermined input data are recorded on a disk-like recording medium on the recording track of which predetermined absolute address information is recorded in advance, comprising input storage means for sequentially storing said input data as a series of recording units of predetermined length, reading out the stored input data at selected positions along the series of recording units and transmitting the read-out data to recording means, and abnormal condition detection and control means continuously monitoring said absolute address information on said recording track, detecting the abnormal condition based on said absolute address information, calculating, on occurrence of said abnormal condition, the return time required for said recording means to return to the leading position of said recording unit that is being recorded on said recording track and controlling the reading position of said input memory control means to be advanced by the number of recording units that corresponds to the calculated result.

According to the present invention, the input data are sequentially recorded by input memory control means for every predetermined storage unit and read out from an arbitrary position along a series of the predetermined recording unit so as to be recorded for every predetermined recording unit on the recording track by recording means, an abnormal condition of the recording means is monitored in abnormal condition detection means with the use of prerecorded absolute address information obtained from the recording track during recording, the return time required for the recording means to return to the leading position of the recording unit during recording is calculated on occurrence of the abnormal condition and the read-out position of the input memory control means is controlled and recorded in advance by the number of the recording units corresponding to the calculated results, whereby the disk recording apparatus may be easily realized in which data may be recorded correctly with prevention of losing of the data to be recorded.

BEST EMBODIMENT OF PRACTICING THE INVENTION

Figure 1:
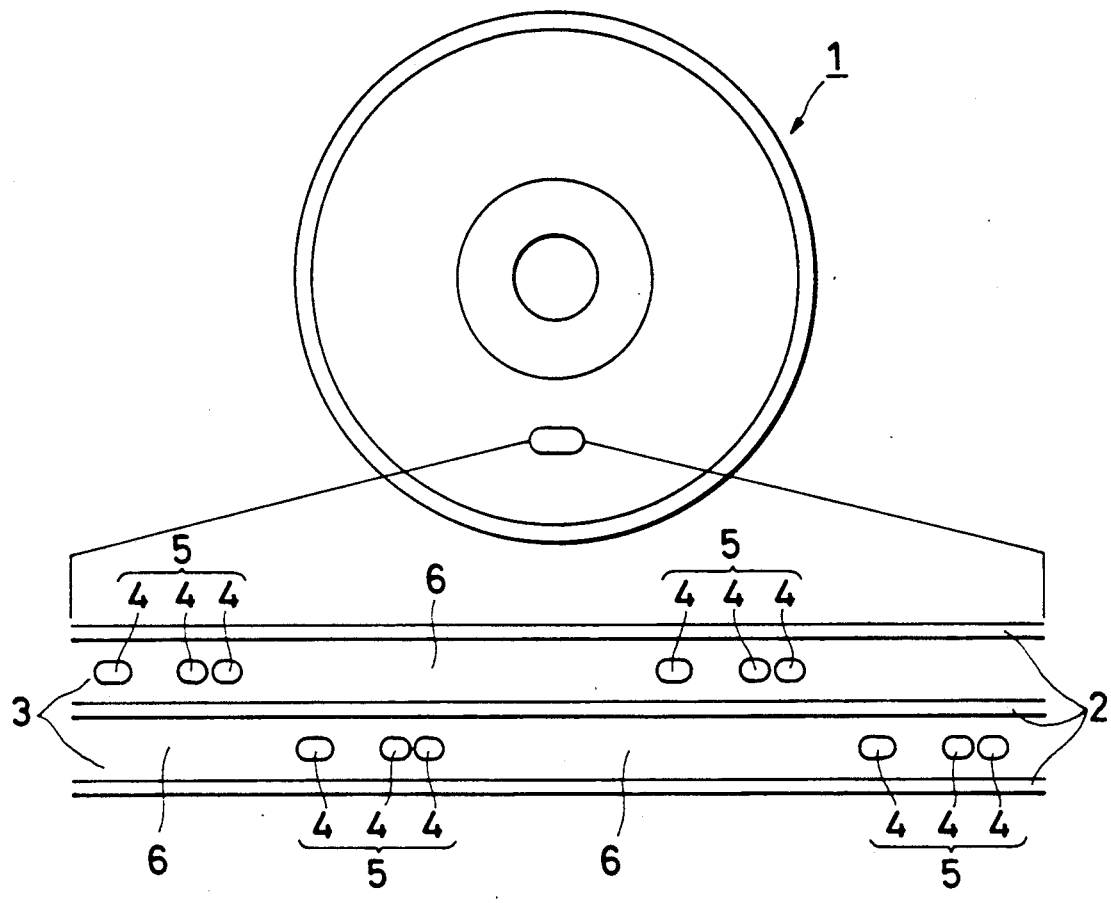
FIG. 1 is a diagrammatic view of a recording format of a CD system magneto-optical disk.
Figure 2:
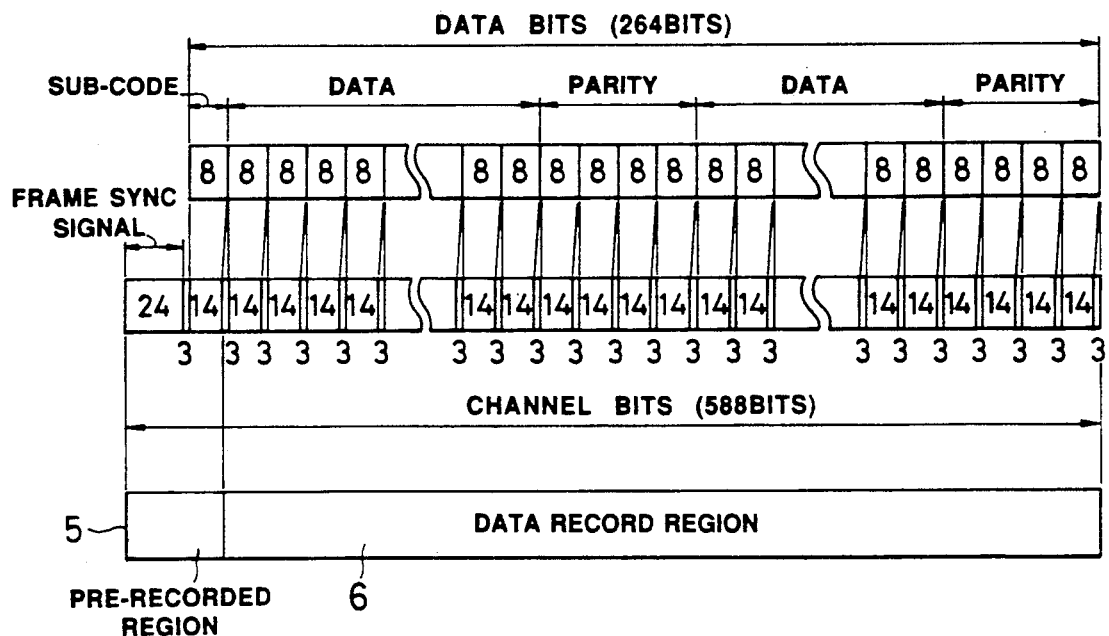
FIG. 2 is a diagrammatic view showing the data format for one frame of data recorded on the mageto-optical disk.
Figure 3:
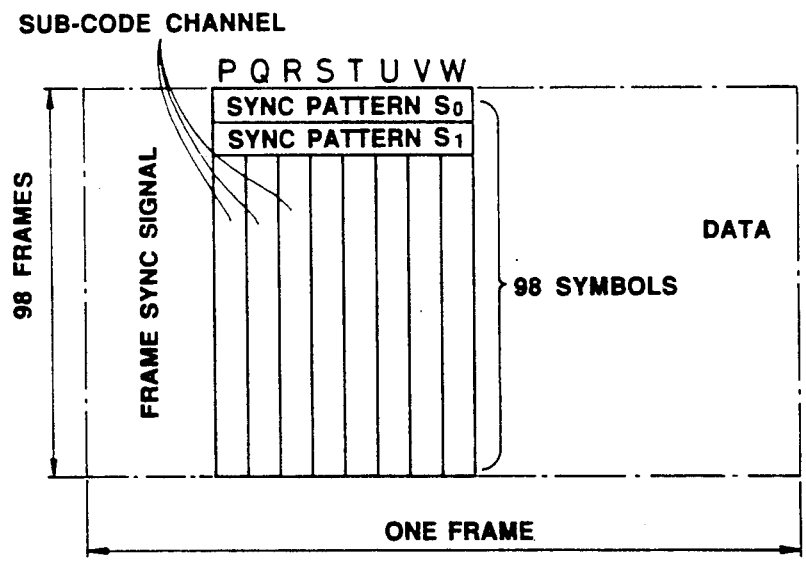
FIG. 3 is a diagrammatic view showing the arrangement of one block of sub-code channels recorded on the magneto-optical disk.

An embodiment of the present invention will be hereinafter explained by referring to the drawings.

Figure 4:
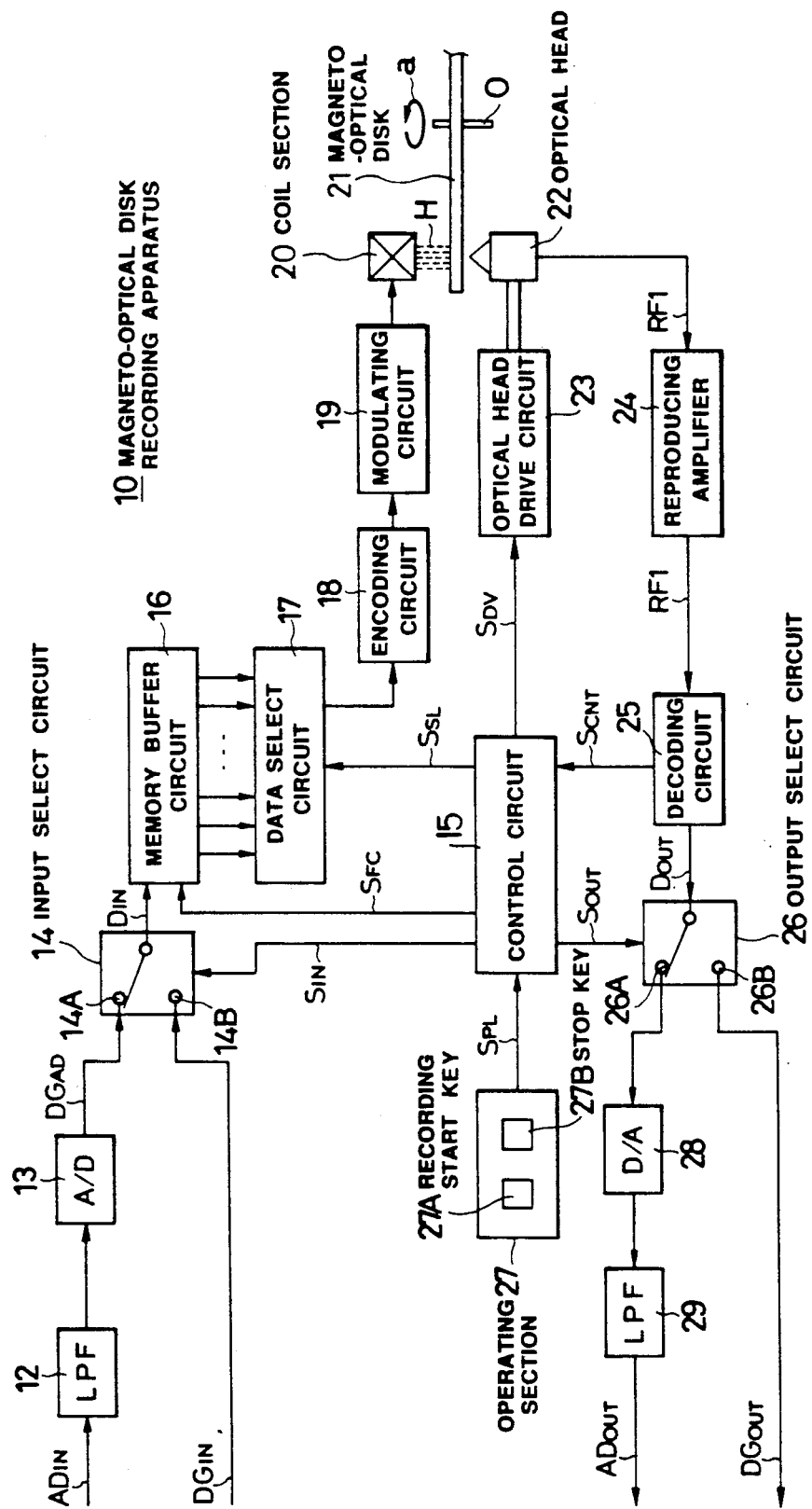
FIG. 4 is a block diagram showing an embodiment of the disk recording apparatus according to the present invention.

In FIG. 4, 10 designates in general a magneto-optical disk recording apparatus of the present invention. Input audio signals $AD_{IN}$ are converted into digital data $DG_{AD}$ in an analog to digital converting circuit 13 via a low pass filter 12 so as to be transmitted to a first input terminal 14A of an input select circuit 14.

Input digital data $DG_{IN}$ are entered directly at a second input terminal 14B of the input select circuit 14 and switching is made between the first input terminal 14A and the second input terminal 14B based on an input select signal $S_{IN}$ applied to a control terminal of the input select circuit 14 from a control circuit 15 which may comprise of a computer, in such a manner that a selected one of the two input digital data $DG_{AD}$ and $DG_{IN}$ is transmitted as digital data $D_{IN}$ to an encoding circuit 18 via a memory buffer circuit 16 and a data select circuit 17.

Figure 5:
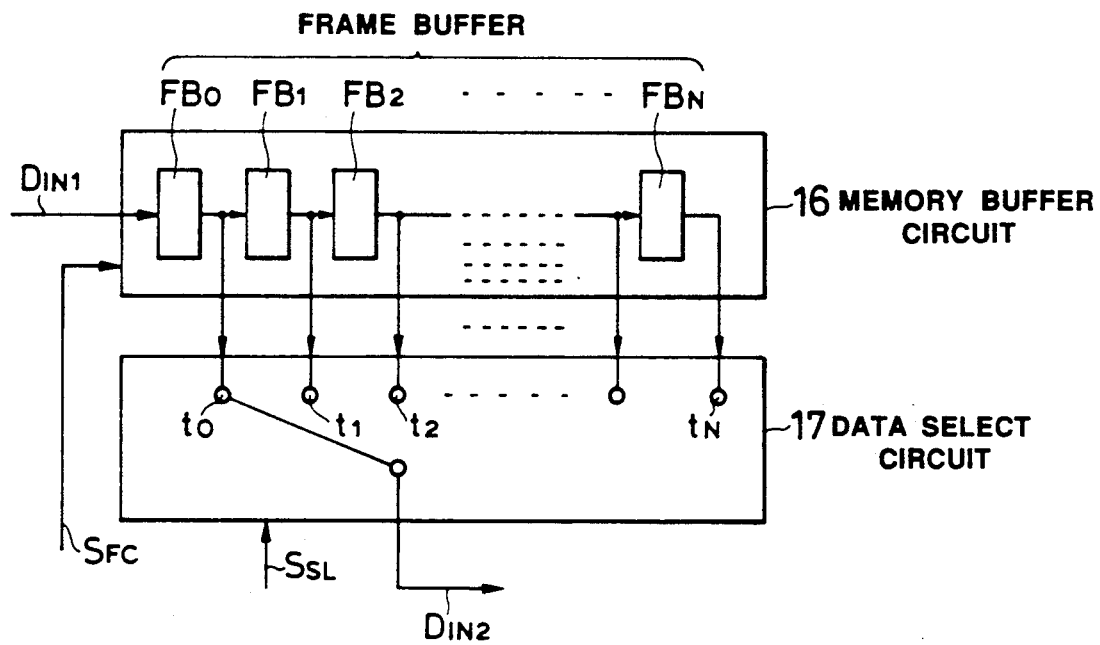
FIG. 5 is a diagrammatic view showing the arrangement of a memory buffer circuit and a data select circuit in the above embodiment.

As shown in FIG. 5, the memory buffer circuit 16 is formed by an N-number of series connected frame buffers $FB_0$, $FB_1$, $FB_2$, ..., $FB_N$, with each frame having a storage capacity of data corresponding to one unit when digital data $D_{IN}$ are recorded on the recording track, for example 98 frames or one large frame in the aforementioned CD standard, and is designed to divide the input digital data $D_{IN}$ at the interval of one frame at the timing of frame clock signals $S_{FC}$ afforded from the control circuit 15. A buffer memory of the first-in first-out (FIFO) type random access memory (RAM) is used as each of the frame buffer memories $FB_0$, $FB_1$, $FB_2$, ..., $FB_N$.

The digital data transmitted from each of the frame buffers $FB_0$, $FB_1$, $FB_1$, $FB_2$, ..., $FB_N$ making up the memory buffer circuit 16 are entered to the frame buffers $FB_1$, $FB_2$, ..., $FB_N$, respectively, at the timing of the frame clock signals $S_{FC}$, while being transmitted to the input terminals $t_0$, $t_1$, $t_2$, ..., $t_N$ of the data select circuit 17.

The data select circuit 17 is formed by, for example, an analog switch, and, based on data select signal $S_{SL}$ afforded from the control circuit 15, selects one of the input terminals $t_0$, $t_1$, $t_2$, ..., $t_N$, so that, with the first digital data $D_{IN1}$ entered to the memory buffer circuit 16, digital data a predetermined time in advance in terms of the units of the aforementioned frame clock signal $S_{FC}$ are transmitted as digital data $D_{IN2}$ to the next following encoding circuit 18.

The encoding circuit 18 encodes the digital data $D_{IN2}$ entered thereto via the data select circuit 17 and the encoded data are modulated in accordance with a predetermined modulation system at the next following modulating circuit 19. The modulated encoded data are supplied to a coil section 20 where a magnetic field H switched in accordance with the digital data $D_{IN}$ is applied to the magneto-optical disk 21 that is rotated about a spindle O as center as indicated by the arrow mark a.

On the lower surface of the magneto-optical disk 21 and in register with the coil section 20, there is arranged the optical head 22 for irradiating the recording laser output on a predetermined one of the recording tracks, such that the digital data $D_{IN}$ may be recorded by the coil section 20 and the optical head 22 on the magneto-optical disk 21 in accordance with the magnetic field modulation recording system.

Meanwhile, the optical head 22 has a focussing servo circuit and a tracking servo circuit in its interior and is adapted to be slid in a direction transverse to the recording tracks on the magneto-optical disk 21 by an optical head drive circuit 23 controlled on the basis of the drive signal $S_{DV}$ supplied from the control circuit 15.

In the illustrative embodiment, control signals SCNT, such as the absolute time or absolute address information from the leading end of the recording track, are recorded as the sub-code, in keeping with the above described standard adopted for the compact disk, on the recording track of the magneto-optical disk 21 by so called groove wobbling, that is, vibration of the groove of the recording track in a direction radially of the disk. The control signals $S_{CNT}$ recorded by the above described groove wobbling can be taken out as the difference of the detected outputs by a detector divided in two along the track direction, that is, as the push-pull signals, since the return light of the light spot from the optical head 22 scanning the wobbled groove is diffracted by the wobbled groove to be modulated in the light intensity on the detector of the optical head 22.

The arrangement is so made that, when recording the digital data $D_{IN}$, the return light obtained at the magneto-optical disk 21 is received by the optical head 22 and supplied as the reproducing signal $RF_1$ to the decoding circuit 25 via a reproducing amplifier 24.

The decoding circuit 25 converts the reproducing signal $RF_1$ into digital data $D_{OUT}$ and transmits the digital data to an output select circuit 26, while extracting a reproducing control signal $S_{CNT}$ from the reproducing signal $RF_1$ and transmitting the signal $RF_1$ to the control circuit 15.

Figure 6:
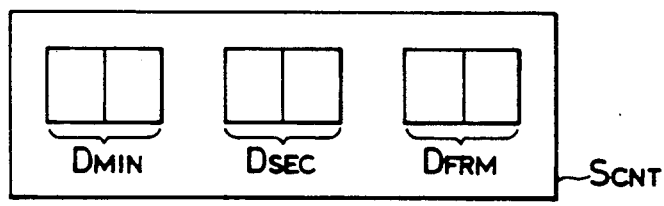
FIG. 6 is a diagrammatic view showing the arrangement of reproducing control signals in the above embodiment.

As shown in FIG. 6, the reproducing control signal $S_{CNT}$ is associated with each frame of the digital data to be recorded and is composed of a minute data $D_{MIN}$, a second data $D_{SEC}$ and frame data $D_{FRM}$, each consisting of eight bits, by way of an example, and is designed to represent as a whole a position on the recording track on the magneto-optical disk 21.

On the basis of the output select signal $S_{OUT}$ supplied from the control circuit 15, the output select circuit 26 selectively outputs the digital data $D_{OUT}$ to a first output terminal 26A or a second output terminal 26B.

The digital data $D_{OUT}$ outputted via first output terminal 26A of the output select circuit 26 are converted via a digital to analog converter 28 into analog data which are outputted as output analog data $AD_{OUT}$ via a low pass filter 29. The digital data $D_{OUT}$ outputted via the second output terminal 26B of the output select circuit 26 are outputted directly as the output digital data $D_{OUT}$.

It is noted that an operating section 27 having a recording start key 27A and a stop key 27B, arranged as the push-pull switch, is connected to the control circuit 15.

Figure 7:
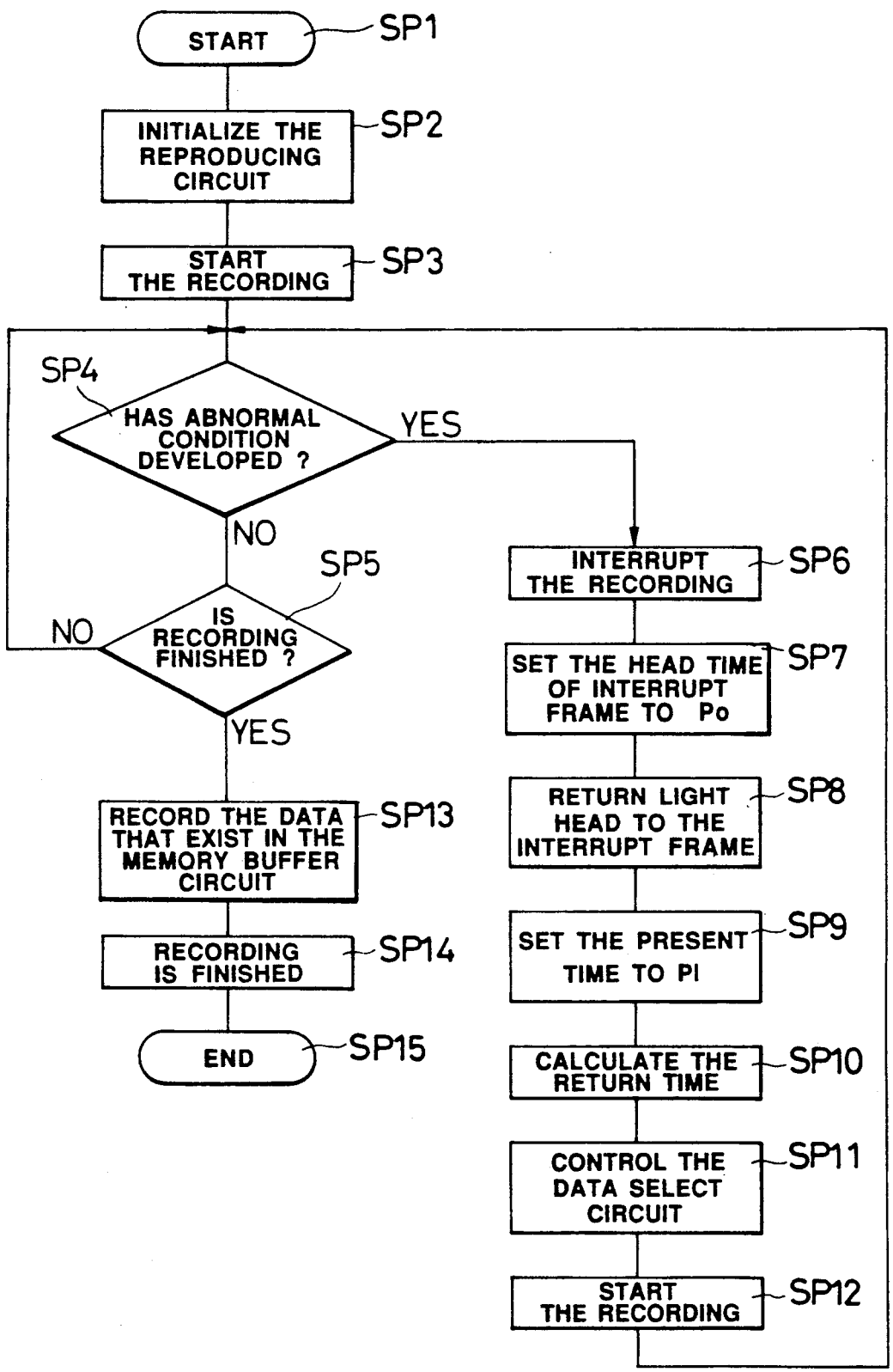
FIG. 7 is a flowchart showing the recording control program.

The control circuit 15 starts the recording operation of predetermined data by executing the record control program shown in FIG. 7 at the timing of entry of an operation control signal $S_{PL}$ indicating that actuation of the recording start key 27A of the operating section 27 has been made, and performs a control operation in such a manner as to prevent the recorded data from vanishing even when an abnormal condition such as incorrect focussing servo control or track jump should occur in the optical head 22 during data recording.

After initiating the control operation by the record control program at a first step SP1, the control circuit 15 sends a data select signal $S_{SL}$ selecting the leading input terminal $t_0$ to the data select circuit 17 at the next second step SP2 to start the recording operation at the next third step SP3.

At this time, the input digital data $D_{IN}$ are divided at into recording units of length equal to a frame buffer based on the frame clock signals $S_{FC}$ so as to be transmitted from the leading frame buffer $FB_0$ to the data select circuit 17 and recorded on the recording track on the magneto-optical disk 21. In practice, the digital data $D_{IN}$ stored in the leading frame buffer $FB_0$ are sequentially stored in the subsequent frame buffers $FB_1$, $FB_2$, ... $FB_N$, at the timing of the frame clock signals $S_{FC}$.

The control circuit 15 when proceeds to the fourth step SP4 to monitor the continuity of the recording track on the magneto-optical disk 21 on the basis of the reproducing control signal $S_{CNT}$ supplied from the decoding circuit 25 to make a decision, based on the results of monitoring, as to whether an abnormal condition such as incorrect focussing servo control or track jump has occurred.

When a negative decision is obtained at the fourth step SP4, the control circuit 15 proceeds to the next fifth step SP5 and decides to whether an operation control signal $S_{PL}$ indicating that actuation of the stop key 27B is inputted.

When a negative decision, that is, a decision to the effect that the recording operation should be continued, is obtained at the above fifth step SP5, the control circuit 15 reverts to the fourth step SP4 to repeat a loop of the steps SP4 and SP5 to continue the recording operation until the stop key 27B is actuated by the user, whilst the control circuit monitors the continuity of the recording track on the magneto-optical disk 21. When an affirmative result indicating that an abnormal condition such as incorrect focussing servo control or track jump has occurred is produced in this state in the fourth step SP4, the control circuit 15 proceeds to the sixth step SP6 to control the optical head 22 to cause it to issue a reproducing laser output to interrupt the recording operation. In the next seventh step SP7, the control circuit 15 stores the time data on the recording track of a frame in which a recording interruption has occurred in a first storage area $P_0$ thereof.

In the eighth step SP8, the control circuit 15 supplies a drive signal $S_{DR}$, such as track jump, to the optical head drive circuit 23 to return the beam spot from the optical head 22 to the leading position of the frame in which the recording interruption has occurred. In the next ninth step SP9, a control circuit 15 stores the current time in the second storage area $P_1$ thereof.

In the next tenth step SP10, the control circuit 15 calculates, using the respective time data stored in the first storage area $P_0$ and in the second storage area $P_1$, the return time required following the occurence of the abnormal condition until the beam spot from the optical head 22 is returned to the leading end of the frame where recording interruption has occurred. In the next eleventh step SP11, the control circuit 15 sends a data select signal $S_{SL}$ to select that one of the input terminals $t_1$, $t_2$, ..., $t_N$ which is in advance of the output of the first memory by the number of the frames corresponding to the calculated return time results to the data select circuit 17.

In the next twelfth step SP12, the control circuit 15 controls the optical head 22 to cause it to issue the recording laser output to resume the recording operation to return to the loop of the aforementioned fourth step SP4 and fifth step SP5.

It will be appreciated from the foregoing that the control circuit 15 executes the aforementioned sixth to twelfth steps SP6, SP7, SP8, SP9, SP10, SP11 and SP12, in such a manner that, when an abnormal condition such as incorrect focussing servo control or track jump of the optical head 22 has occurred in the magneto-optical disk 21, the control circuit causes the optical head 22 to be returned to a position on the magneto-optical disk 21 corresponding to the leading end of the frame where the abnormal condition has occurred, while the control circuit resumes the recording operation on the magneto-optical disk 21 from that one of the frame buffers $FB_1$, $FB_2$, ..., $FB_N$ which is in advance by the number of the frames corresponding to the time involved during this procedure, so that recording may be made with data loss even on occurrence of an abnormal condition.

When an affirmative result indicating that the stop key 17B has been actuated is produced at the fifth step SP5, the control circuit 15 proceeds to the next thirteenth step SP13 and causes, when the data select circuit 17 selects the frame buffers $FB_1, FB_2, \ldots, FB_N$ other than the leading frame buffer $FB_0$, the digital data $D_{IN}$ stored in the predetermined frames $FB_0, FB_1, FB_2, \ldots, FB_N$ to be stored on the magneto-optical disk 21. The control circuit 15 then causes the recording operation to be terminated at the next fourteenth step SP14 and terminates the recording control program at the next fifteenth step SP15.

In the above arrangement, there may be realized a magneto-optical disk recording apparatus in which, even when an abnormal condition such as incorrect focussing servo control or track jump should occur in the optical head during data recording, data recording may be made correctly with prevention of vanishing of the recording data.

In the above described illustrative embodiment, a series connection of plural frame buffers is used as the memory buffer circuit, and an analog switch type circuit is used as the data select circuit. However, the present invention is not limited thereto and the effect similar to that of the illustrative embodiment may be achieved with the use of other types of circuits, such as the memory circuit in which the write and read-out addresses may be controlled in a ring-like manner.

Although the magneto-optical disk in which the absolute time information from the leading end is recorded thereon by land wobbling is used in the illustrative embodiment as the magneto-optical disk of the present invention, the absolute address information is not limited thereto, but may also be address numbers, as an example, while, as the recording method, recording pits may be formed on the recording tracks, or recording may be made by groove wobbling In sum, the effect similar to that described in the above illustrative embodiment may be realized if the absolute address information such as the time data or address number could be reproduced from the recording track.

In addition, although the description has been made in the illustrative embodiment of the case in which the recording apparatus of the present invention is applied to the compact disk type magneto-optical disk apparatus, the present invention is not limited thereto, but may be extensively applied to other types of the recording apparatus such as optical or magnetic disk.

I claim:

1. A disk recording apparatus in which input data are recorded on a recording medium having recording tracks in which absolute address information is prerecorded, comprising:

memory buffer means receiving the input data and dividing said data into predetermined recording units for sequential storage in respective serially connected recording unit buffer memories included in said memory buffer means;

data selecting means connected to said memory buffer means for reading out said recording units of stored input data from a selected on of said serially connected recording unit buffer memories;

means for recording said recording units read out from said selected one of said recording buffer memories in selected tracks of the recording medium;

means for monitoring the prerecorded absolute address information from said recording medium, responsive to said recording means, while said means for recording is recording said recording units on said recording medium and producing an output signal; and control means connected to said data selecting means and being responsive to said output signal from said means for monitoring for detecting the existence of an abnormal condition, from the recording medium, based on the absolute address information then being monitored, for controlling a position of said means for recording from a present point on a track to a previous point on a track at which an abnormal condition was detected and calculating an amount of recording units that were supposed to be recorded in a track or tracks between said present point and said previous point, and for controlling said data selecting means to read out said stored recording units from a one of said serially connected buffer memories that is past a recording start point by an amount of recording units equal to said calculated amount of recording units and reading out that buffer memory to the means for recording.

2. The disk recording apparatus according to claim 1 characterized in that said absolute address information is pre-recorded on the recording tracks as control signals for every predetermined recording unit and wherein said means for recording includes an optical head and said means for monitoring monitors a return light produced by said means for recording from said recording medium, whereby the control means detects the abnormal condition of the recording operation based on the absolute address information in the return light from the recording tracks.

3. The disk recording apparatus according to claim 2, wherein said recording medium is a magneto-optical recording medium and said predetermined recording units are of a predetermined length further comprising a magnetic field modulation system for generating a magnetic field to the recording medium in accordance with said predetermined recording units of said predetermined length, said absolute address information is pre-recorded on said magneto-optical recording medium said pre-recorded absolute address information includes track wobbling information.

4. The disk recording apparatus according to claim 3 characterized in that said optical head in said means for recording comprises a one-beam optical head producing said return light from said magneto-optical recording medium and said optical head cooperates with said magnetic modulation system which includes a magnetic head which is also included in said means for recording, to record recording units of stored input data read out from said memory buffer means on said magneto-optical recording medium.

5. The disk recording apparatus according to claim 1 wherein said means for recording comprises an optical head for scanning the recording tracks of the recording medium by a laser light beam to record data, and said optical head comprising means for reproducing data from said recording medium said control means switches the laser power of said optical head to a reproducing level on detection of an abnormal condition during recording.

6. The disk recording apparatus according to claim 1 wherein each of said serially connected buffer memories comprises a first-in first-out memory having a capacity for storing one predetermined recording said unit of input data.

7. The disk recording apparatus according to claim 6 characterized in that recording units of said input data are read out from one of said first-in first-out memories selected by said data selecting means, said selected means an analog switch having inputs connected to respective outputs of each of said first-in first-out memories.

* * * * *